May 16, 1967  B. BERGSNOV-HANSEN  3,319,542
CONTROLLED DIVERGENCY REFLECTOR
Filed Dec. 26, 1962  3 Sheets-Sheet 1
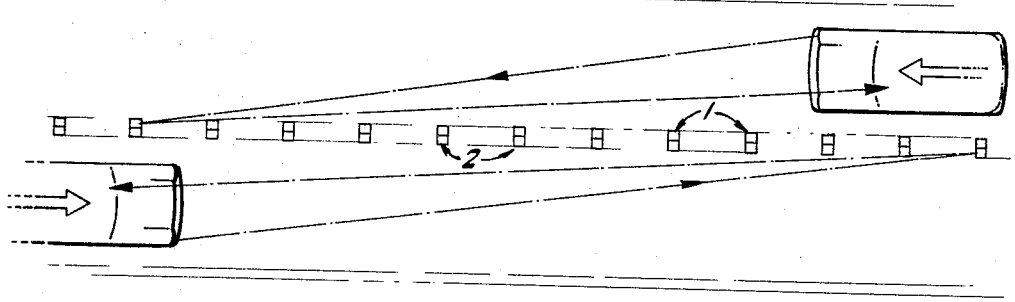
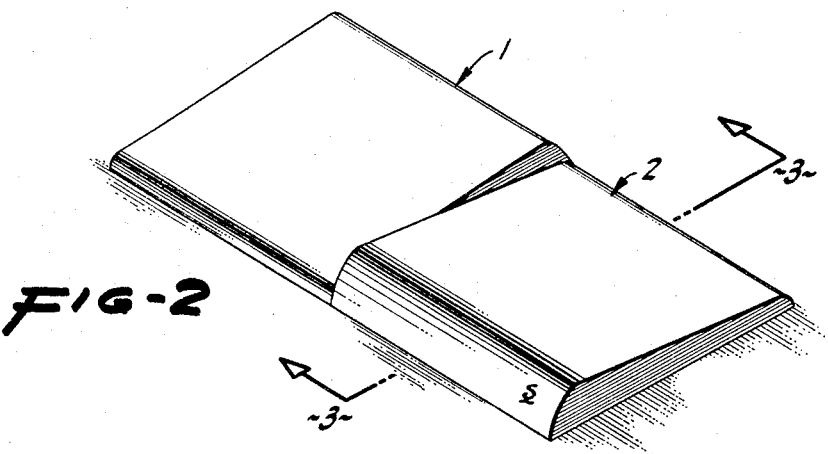
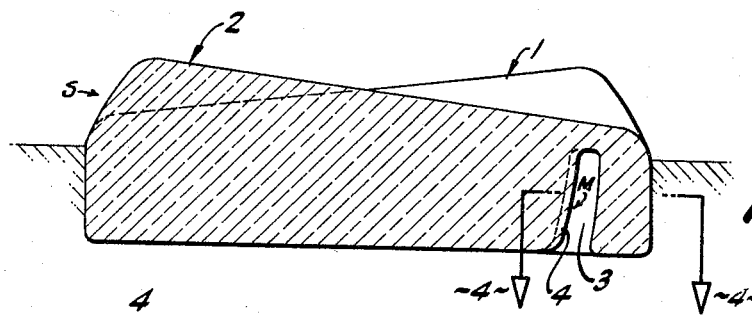
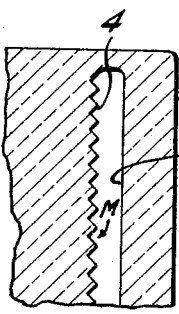
INVENTOR.
BJORN BERGSNOV-HANSEN
BY
ATTORNEYS May 16, 1967  B. BERGSNOV-HANSEN  3,319,542
CONTROLLED DIVERGENCY REFLECTOR
Filed Dec. 26, 1962  3 Sheets-Sheet 3
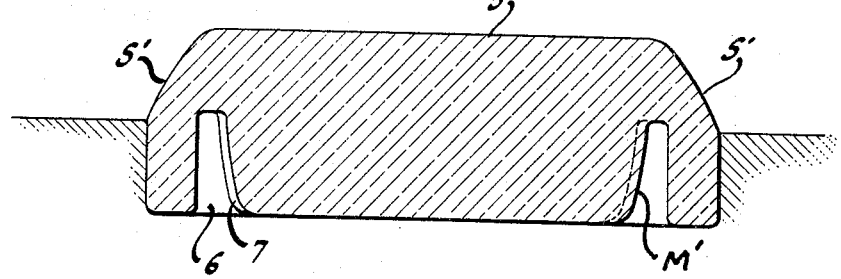
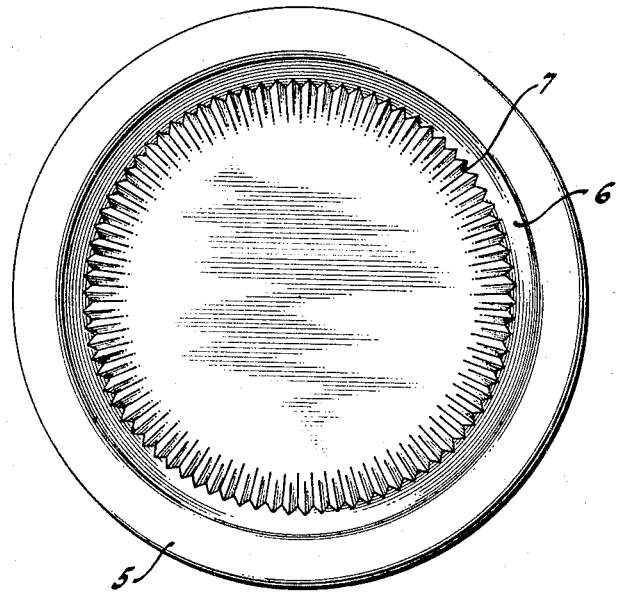
INVENTOR.
BJORN BERGSNOV-HANSEN
BY
*Meelin and Hanscom*
ATTORNEYS 3,319,542
CONTROLLED DIVERGENCY REFLECTOR
Bjorn Bergsnov-Hansen, Palo Alto, Calif., assignor, by mesne assignments, to Chandler Ide, San Francisco, Calif.
Filed Dec. 26, 1962, Ser. No. 247,009
10 Claims. (Cl. 94—1.5)

This invention relates to and in general has for its object the provision of a highway marker of the reflector type for delineating the center line or shoulders of a highway.

Another one of the objects of this invention is the provision of a reflector type of highway marker wherein the axis of a beam of light emanating from an approaching automobile headlight will be substantially coincident with the axis of the beam of light reflected by the marker over a substantial distance of travel of the automobile.

A further object of this invention is the provision of a marker of the character above described wherein the reflector is so constructed that there will be a substantial divergence of the reflected beam both vertically and horizontally without undue sacrifice of adequate brightness.

Still another object of this invention is the provision of a highway marker the operation of which will not be influenced by heavy rains or by the presence on the highway of oily films.

A further object of this invention is the provision of a marker which does not necessitate accurate alignment.

More specifically, one of the objects of this invention is the provision of a glass highway marker arranged to be embedded in a highway and provided with a forwardly facing, concave cylindrical mirror and with an opposed convex cylindrical light entering and refracting surface, the axes of the mirror and refracting surface being parallel with each other and the location and radius of curvature of the mirror being such that it forms an image of said surface substantially coinciding with the surface itself. As a result of this, substantially all light from the headlights of a car, entering this optical system, will leave it through this surface.

Still another object of this invention is the provision of a marker of the character above described in the form of a glass disc wherein the required convex cylindrical refracting surface is formed on the periphery of the disc and wherein the required concave cylindrical mirror is formed within the disc and coaxial therewith.

Still another object of this invention is the provision of a marker of the character described wherein horizontal tracking of the reflected beam is obtained by giving the mirror a 90° sawtooth configuration.

A further object of this invention is the provision of a marker of the character above described formed of two generally rectangular integral units, one unit being arranged to be activated by the headlights of cars approaching in one direction and the other being arranged to be activated by the headlights of cars approaching from the opposite direction.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 1 is a schematic plan view of a highway equipped with markers embodying the objects of my invention.

FIG. 2 is a perspective view of one of the dual-unit markers schematically illustrated in FIG. 1.

FIG. 3 is an enlarged transverse section taken on the section line 3—3 of FIG. 2.

FIG. 4 is a fragmentary horizontal section taken on the section line 4—4 of FIG. 3.

FIG. 7 is a vertical midsection taken through a modified form of marker of disc configuration.

FIG. 8 is a bottom plan view of the marker illustrated in section in FIG. 7.

General configuration

The marker illustrated in FIG. 2 includes identical but reversely directed units 1 and 2 molded from clear glass as an integral structure and, as diagrammatically indicated in FIG. 1, these markers are arranged to be partially embedded along the center line of a highway so that its units 1 will be activated by cars traveling from left to right, and the unit 2 will be activated by cars traveling from right to left.

Each of the units 1 and 2 includes adjacent its rear end an upwardly extending and slightly converging recess 3 (FIG. 3). The forward wall of the recess is of cylindrical configuration, is formed with a saw-tooth surface 4 as illustrated in FIG. 4, and is metalized so as to form a mirror. This wall can therefore be considered as a cylindrical, concave mirror M formed upon a horizontal axis having a saw-tooth surface and capable of reflecting light entering the forward end of the unit.

Formed on the upper forward corner of each of the units 1 and 2 is a convex circular cylindrical light entering surface S.

General dimensions and shape of surfaces

A versatile road marker of the character herein described is designed to operate under a range of optical conditions. The light from an automobile's headlights, considered parallel for all practical purposes, will hit the pavement at an incident angle $\alpha$, which varies with distance. To get an idea of the range involved, some measurements were made on private cars. These measurements indicate that the angle $\alpha$ may be taken roughly as 0°39′ at 300 feet and 4°48′ at 30 feet. Under these conditions, and in accordance with Fresnel's laws, any kind of arrangement flush with the pavement is ruled out, for then 1% or less of the light would actually enter the optical system. Furthermore, not all of a heavy rain would necessarily drain off the highway, and the optical device should have a certain minimum height to penetrate the surface of any puddles, as well as having self-draining surfaces.

Figure 6:
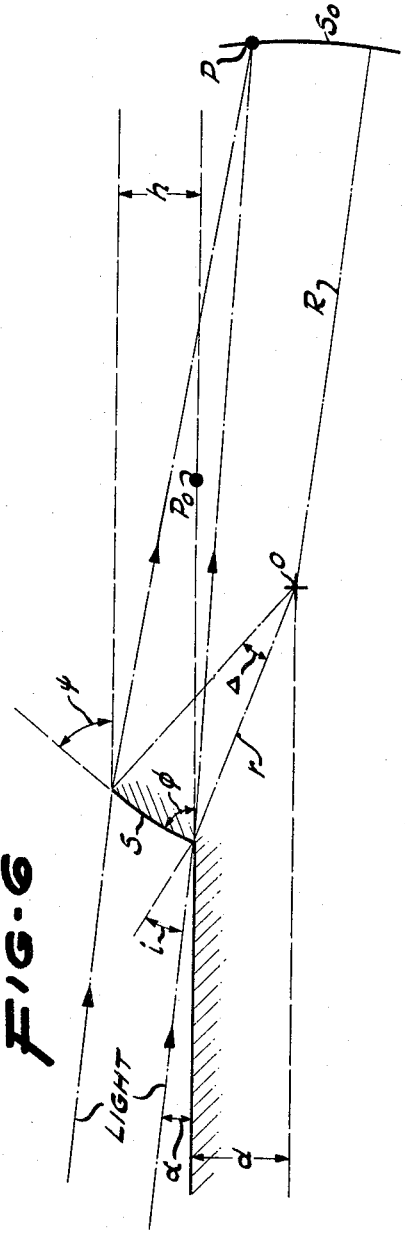
FIG. 6 is a diagram showing the essential optical surfaces and dimensions of an optical system embodying the objects of my invention and the relationship of these dimensions to the surface of a highway.

Referring to FIG. 6, the internal angle between pavement and emerging surface of the road marker, identified as $\phi$, should for practical purposes be smaller than 90° to avoid accumulation of dirt while also making the surface self-cleaning when washed by rains. The use of a curved surface as illustrated minimizes the impact of a car rolling over it, and the particular selection of a circular curvature is desirable since it is a fairly simple surface to treat mathematically, while also being easy to machine. For these reasons a circular, convex, light entering surface S is contemplated, and the surface will be defined by a selection of angles $\phi$, $\psi$, and the height $h$, which then determine the location of the center of curvature O and the radius of curvature $r$.

In accordance with the principles of Fresnel's laws, a reasonable amount of light will enter surface S of the road marker providing that the angle $i$ (i.e., the angle between a light ray beamed from a car headlight and a line normal to the surface S at the point of light ray impingement) is less than 40°. Assuming practical values of 70° and 50° for the angles $\phi$ and $\psi$, respectively, and a relatively small value for $h$ such as 6 mm., then the light rays coming from headlights of cars at a distance of 300 feet from the road marker will have an angle of incidence $i$ less than 40°. Since light coming from a car headlight disposed at a distance closer than 300 feet will enter the road marker at more favorable angles, a greater amount of light will enter the marker as the vehicle advances.

It is to be noted that the choice of angles $\phi$ and $\psi$ as well as the height of marker $h$ involves a somewhat arbitrary selection and requires a compromise between the optical demands of an angle of incidence less than 40° and practical considerations on the other hand. It is to be understood, therefore, that the values assigned to each of the parameters $\phi$, $\psi$ and $h$, can be varied, although a choice of such will determine the characteristics of the marker as well as the physical dimensions of the entering surface S. For purposes of machining the surface S, it may be useful to geometrically compute the angle $\Delta$, the radius of surface curvature $r$, and the distance $d$ which are indicated in FIG. 6. By way of example, and using an angle $\phi$ of 70°, an angle $\psi$ of 50°, and a height $h$ of 6 mm.: $\Delta=20°$; $r=20$ mm., and $d=7$ mm.

Referring again to FIG. 6, light entering through the surface S may be considered parallel for practical purposes, and each ray of light passing therethrough will converge inside the road marker to a focal point P. As the headlights approach the marker the point P will, of course, move along a curve $S_0$. From simple geometrical optics it will be understood that the curve $S_0$ defines a circular arc having its center at O and a radius R, which depends upon the ratio of refractive indices of the marker $n'$, and that of its surroundings $n$; and the radius R is defined by the formula: $R=nr/(n'-n)$.

If the optical media are air and glass (or Lucite), $n=1.0$ and $n'=1.5$; and if the values of angles $\phi$ and $\psi$ are 70° and 50°, respectively, and $r=20$ mm., then: $R=2r=40$ mm.

Since the distance between road markers, which define a highway, and oncoming vehicles is a variable, and since the light rays which enter the marker may be directed from different side angles of approach, the optical system of an effective road marker must be capable of reflecting light rays toward the driver over a range of approach angles. In this connection, it is to be understood that reflected light rays should, to some degree, "track" an oncoming vehicle both vertically and horizontally.

This invention especially contemplates a road marker construction which will reflect light rays in directions which may be easily observed by drivers both over an effective range of distances from the marker and at various approach angles. To accomplish this function, a controlled amount of vertical and horizontal divergence is provided by selecting a proper light-reflecting surface (or mirror) and locating that surface relative to the light entering surface S. In addition, the road marker construction herein contemplated utilizes a principle of light economy in order to return as reflected light substantially all light rays entering the surface S.

*Vertical tracking and divergence*

Studies indicate that with an "average car" disposed at a distance of 300 feet from a marker embedded in a roadway there is an angular difference of about 2° between the driver's eyes and the vehicle headlights as seen from the marker. This means that the angle of divergence between entering light rays and reflected light rays leaving the marker need not be large in order to make the reflected rays visible to a driver, although more divergence is necessary if they are to be seen at relatively close distances. (Of course at a distance of 300 feet only a very small amount of divergence is required.) With this in mind, road markers 1 and 2 are constructed so as to have a minimum useful angle of vertical divergence. In that way there will be inherent economy in using all light rays which enter the marker through the surface S. It so happens that the principle of controlled divergence herein employed is compatible with an optical solution for returning by reflection all light rays which enter the marker surface S. Thus there will be further economy in the use of light rays which enter the marker, thereby increasing the apparent brightness of that marker.

It is realized, of course, that a parallel reflection of all light rays would be a desirable optical solution from a standpoint of brightness, but this solution would be impractical in attempting to construct an inexpensive road marker capable of reflecting light received from many different angles and returning them in yet different directions.

Figure 5:
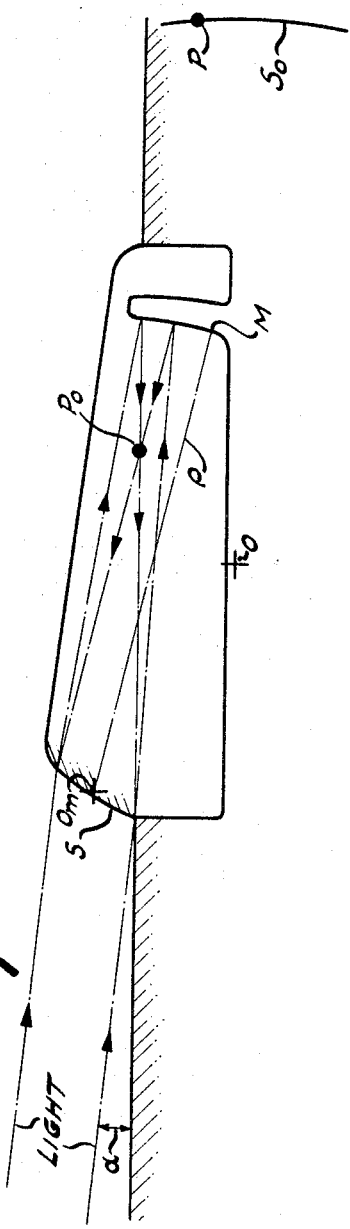
FIG. 5 is an elevation of one marker, constructed as shown by FIGS. 3 and 4, embedded in a highway, and in which the optics of the marker have been indicated.

Referring to FIG. 6, with a given circular surface S it may be shown that there is one point $P_0$ (for any given angle $\alpha$) through which point reflected light rays will pass and be emitted from the surface S in a selected angle of divergence relative to the light beam. With this in mind and referring to FIG. 5, markers 1 and 2 are constructed with a light-reflecting surface of mirror M capable of focusing reflected light rays toward a given point $P_0$, which may then be considered the focal point of reflected light rays. Now, by selecting or providing a mirror M having a center of curvature $O_m$ which lies substantially in the surface S and equidistant from points of limiting rays which enter the surface, the image of S formed by M will coincide with S itself—that is, all light entering the system through S will be reflected by M and will leave the optical system through S. It will be evident that this is a light-economizing arrangement or system which theoretically reflects all parallel light rays entering the surface S at a given approach angle to the pavement (angle $\alpha$).

To satisfy the condition that mirror M form an image of S conicdent with S itself, and also the condition that the reflected rays leaving surface S be divergent at some given angle relative to incoming light rays, the radius of curvature $\rho$ for the mirror M must be particularly selected. Since the locations of O and $P_0$ are known (or can be computed), $O_m$ can be located and the radius of curvature $\rho$ can be computer as a function of the angle $\alpha$. This assumes, of course, that refractive indices of the optical system are also given.

If we assume that the road marker is made of glass or Lucite, it has been determined that the radius of curvature $\rho$ for a mirror M would be between 44 mm. and 48 mm. for angular distances corresponding to 30 feet from the marker and 300 feet from the marker, respectively. This determination is based upon the normal required angle of divergence for an average car at the given distances, and the value of $\rho$ for intermediate distances may be expressed as follows:

$$44 \text{ mm.} \leq \rho \leq 48 \text{ mm.}$$

Since the variation of $\rho$ is very small, we might assume a value of $\rho$ which is constant and therefore independent of the angle $\alpha$. This simplifies the construction of the marker.

The above computation and divergence estimate does not take into consideration unusual conditions under which a road marker should operate. In particular, it fails to account for a change of grade in the roadway and the approaching car was considered a statistical average. To increase the versatility of the road marker, one should be more generous with the divergence of reflected light rays, and to do this the value of $\rho$ should be smaller than theory would indicate. In test markers thus far made a $\rho$ in the order of 38 mm. has been used, resulting in an angle between the axis and the upper limiting ray of 5°, well beyond the 2° required for an "average car" under ideal conditions. As a practical matter, the angle of divergency might be increased to a value of 10° without impairing the operation of the road marker.

It is to be understood that for any given surface S and radius of curvature $\rho$ (determined in view of the above considerations) the required angular distance of the mirror surface M may be easily computed. However, inasmuch as the road markers may be employed on surfaces above the grade of a roadway or disposed at angles of incline other than the roadway at a distance therefrom, a larger mirror surface is desirable. It is believed that the mirror surface should be sufficiently large so that the axis of incident and reflected beams of light will substantially coincide for all directions of incident light within 10° of a head-on direction to the surface S.

To summarize the above, the light-entering surface S will refract a parallel light beam entering the body so that it would normally be focused at focal point P, the distance from the light-entering surface S to point P being the focal length with respect to the light-entering surface. The radius of curvature of the mirror M is less than said focal length so that the mirror is positioned between the light-entering surface S and the focal point P thereof. By this construction the parallel light rays entering the light-entering surface S will be reflected by said mirror to and focused at the point $P_o$ which is between the mirror and light-entering surface. The light will now be considered as emanating from this point within the body and will emerge from the light-entering surface in the shape of a diverging bundle of rays whose axis is parallel to the parallel light entering the body.

It is also aparent from the foregoing that the device can be constructed so that the angle of divergence of the emerging bundle of light rays can be predetermined. For example, the point $P_o$ has been described as the point from which the angle of divergence is 5°. If it is desired to have an angle of divergence of 10° then the point $P_o$ would be located more closely to the light-entering surface. Conversely, if it is desired to have an angle of divergence of 3°, the $P_o$ would be located further from the light-entering surface.

The location of point $P_o$ relative to the light-entering surface also depends upon the degree of curvature of the light-entering surface. For example, the more sharply curved is the light-entering surface, the shorter is the focal length of the light-entering surface, and the closer point $P_o$ will be to the light-entering surface to produce the same degree of divergence of the reflected beam from the device.

However, regardless of the degree of curvature of the light-entering surface, for any given curvature thereof, there will be a predetermined point $P_o$ which will produce a predetermined amount of divergence of the reflected light beam, and this predetermined point $P_o$ will always be less than the focal length of the light-entering surface. To obtain the controlled divergence, the mirror surface M, which has a center of curvature located at $\theta_m$, is always located between the light-entering surface and focal point P so as to reflect the light and focus it at point $P_o$.

As may be seen, the radius of curvature of the mirror surface M must be less than the focal length of the light-entering surface. Further, the shorter the radius of curvature of the mirror surface, the closer point $P_o$ will be to the light-entering surface S and the greater will be the angle of divergence of the light reflected back from the device.

Thus, to obtain a predetermined angle of divergence from a given device having a particular curvature of the light-entering surface S, the location of point $P_o$ must be predetermined. Then, the radius of curvature of the mirror surface M must be related to the focal length of the light-entering surface so that the light rays will be reflected by the mirror surface M to be focused at the predetermined point $P_o$.

Horizontal tracking and divergence

Thus far this disclosure has been concerned with problems connected with vertical tracking of reflected light rays. However, there is also a problem with respect to horizontal or azimuthal tracking. The same optical principle as discussed above might be applied for introducing a lateral or horizontal divergence of light. However, a mere divergence of 2° or even 5° would not be enough for a driver to spot the marker under all conditions.

Computations from an "average car" show that if the reflected beam has an angle of 0°40′ in vertical projection between axis and limiting ray, the driver will just see light from his left headlight, but the equivalent angle for light coming from the right headlight is 11°40′. These computations assume that the car is 2 feet away from the left white line on a straight road and 30 feet away from the marker (the conditions are slightly more favorable for markers located on the right side of the car). In view of these facts, and particularly since the road marker might be approached laterally at high angles of incidence relative to a normal line to the surface S, it was decided that a rather wide divergency in the reflected beam was necessary. Such divergency is obtained with the markers 1 and 2 by resorting to a saw-tooth surface 4, indicated in FIG. 4, and consisting of small triangular grooves having an open angle of 90° to give proper tracking. The width of each saw-tooth groove, from top to bottom of the groove, may be in the order of 2 mm. Experience with this type of reflector indicates satisfactory divergence. It has been found that a road marker constructed in accordance with the above teaching and which utilizes a concave mirror having a saw-tooth surface would produce divergence enabling the marker to be observed from side angles within 40° relative to the head-on direction.

Circular disc form of marker

FIGS. 7 and 8 of the drawings illustrate a second embodiment of this invention, and comprising a substantially circular disc marker 5 having a ring-shaped cavity 6. The centermost curved surface 7 of the cavity 6 forms a curved mirror M′ defined by generating a concave arc about the vertical center axis, and having a saw-tooth surface capable of reflecting light which enters the disc from the opposite side through the curved light-entering surface S′. The surface S′ may be defined by generating a convex arc about the vertical center axis, but with a generating radius greater than the generating radius of surface 7. The dimensional construction of the marker 5, with relationship to the location and size of the mirror surface M′ and surface S′, is substantially the same as with the markers 1 and 2. Thus, each of the above described formulations would also be applied to the preferred construction of marker 5. In this respect the radii of arc curvatures which are used to generate mirror surface M′ and light-entering surface S′ are determined by the refractive index of the material from which the marker is formed, and such that the axis of incident and reflected beams or rays of light directed axially of the disc coincide for all directions of incident light within approximately 10° elevation. It will be realized, of course, that since marker 5 is of circular configuration it will receive and reflect the light rays directed toward it with equal intensity or brightness irrespective of the radial direction from which a vehicle approaches the marker. For this reason, marker 5 would be especially useful for highway use where the headlight beams are directed at horizontal angles greater than 40° from the normal headon direction.

What I claim and desire to secure by Letters Patent is:
1. A highway delineating marker comprising:
   a light-refracting body having a light-entering surface forming a convex arc in a vertical plane, a mirror formed on said body and forming a concave arc in said vertical plane, said mirror being so positioned relative to said light-entering surface that light in said vertical plane which enters said body through said light-entering surface is refracted toward said mirror, said mirror having a center of curvature substantially in the middle of said light-entering surface so that the image of the light-entering surface reflected by said mirror is coincident with said light-entering surface, the radius of curvature of said mirror being sufficiently less than the focal length with respect to said light-entering surface that parallel light rays entering said body through said light-entering surface will be reflected by said mirror to and focused at a predetermined point between said mirror and light-entering surface and will emerge from said light-entering surface in the shape of a diverging bundle of rays whose axis is parallel to the light entering said body and whose angle of divergence is predetermined.

2. A highway delineating marker as set forth in claim 1, wherein said light-entering surface is a radially arcuate portion of an elongated cylindrical surface, and wherein said mirror is a radially arcuate portion of an elongated cylindrical surface, and wherein the axis of said mirror is parallel to the axis of said light-entering surface and lies substantially along the middle of said light-entering surface.

3. A highway delineating marker as set forth in claim 2, wherein the surface of said mirror is provided with triangular grooves disposed in planes normal to the axis of said mirror.

4. A highway delineating marker as set forth in claim 1, wherein said light-entering surface and said mirror are formed by generating said convex and concave arcs about a vertical axis at fixed generating radii, and wherein the center of curvature of any vertically concave portion of said mirror lies substantially at the middle of the vertically convex portion of the light-entering surface diametrically opposite thereto.

5. A highway delineating marker as set forth in claim 4, wherein said mirror is provided with triangular grooves disposed in vertical planes and directed towards said vertical axis.

6. A highway delineating marker as set forth in claim 1, wherein the vertical angle subtended by the concave arc of said mirror is sufficiently great that all light rays incident to the light-entering surface up to approximately 10° from horizontal and which enter said body through said light-entering surface will be reflected by said mirror back to said light-entering surface.

7. A highway delineating marker as set forth in claim 6, wherein said light-entering surface is a radially arcuate portion of an elongated cylindrical surface, and wherein said mirror is a radially arcuate portion of an elongated cylindrical surface, and wherein the axis of said mirror is parallel to the axis of said light-entering surface and lies substantially along the middle of said light-entering surface.

8. A highway delineating marker as set forth in claim 7, wherein the surface of said mirror is provided with triangular grooves disposed in planes normal to the axis of said mirror.

9. A highway delineating marker as set forth in claim 6, wherein said light-entering surface and said mirror are formed by generating said convex and concave arcs about a vertical axis at fixed generating radii, and wherein the center of curvature of any vertically concave portion of said mirror lies substantially at the middle of the vertically convex portion of the light-entering surface diametrically opposite thereto.

10. A highway delineating marker as set forth in claim 9, wherein said mirror is provided with triangular grooves disposed in vertical planes and directed towards said vertical axis.

References Cited by the Examiner

UNITED STATES PATENTS

| 2,067,701 | 1/1937 | James | 88—82 |
| 2,169,674 | 8/1939 | Adas | 88—79 |
| 2,310,817 | 2/1943 | Taylor | 88—82 |
| 2,991,698 | 7/1961 | Leubaz | 88—79 |

FOREIGN PATENTS 786,987    11/1957    Great Britain.

JEWELL H. PEDERSEN, *Primary Examiner.*

T. L. HUDSON, J. K. CORBIN, *Assistant Examiners.*